US010205844B2

(12) United States Patent
Miyake et al.

(10) Patent No.: US 10,205,844 B2
(45) Date of Patent: Feb. 12, 2019

(54) LIGHT BEAM SCANNING DEVICE, IMAGE FORMING APPARATUS, AND SCANNING LINE ADJUSTING METHOD

(71) Applicants: Shinsuke Miyake, Saitama (JP); Katsunori Shoji, Kanagawa (JP); Kazunori Watanabe, Tokyo (JP); Shigeaki Imai, Kanagawa (JP)

(72) Inventors: Shinsuke Miyake, Saitama (JP); Katsunori Shoji, Kanagawa (JP); Kazunori Watanabe, Tokyo (JP); Shigeaki Imai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 837 days.

(21) Appl. No.: 13/716,944

(22) Filed: Dec. 17, 2012

(65) Prior Publication Data
US 2013/0176602 A1 Jul. 11, 2013

(30) Foreign Application Priority Data

Jan. 6, 2012 (JP) ................................ 2012-000879

(51) Int. Cl.
*H04N 1/04* (2006.01)
*G02B 26/10* (2006.01)
(Continued)

(52) U.S. Cl.
CPC ........... *H04N 1/04* (2013.01); *G02B 26/0825* (2013.01); *G02B 26/10* (2013.01); *G02B 26/123* (2013.01);
(Continued)

(58) Field of Classification Search
CPC .. B41J 2/471; B41J 2/473; H04N 1/04; H04N 1/0473; G02B 26/10; G02B 26/0825; G02B 26/123; G02B 27/0031
(Continued)

(56) References Cited

U.S. PATENT DOCUMENTS

2004/0165240 A1 8/2004 Suzuki et al.
2004/0240000 A1 12/2004 Miyatake et al.
(Continued)

FOREIGN PATENT DOCUMENTS

CN 101256284 A 9/2008
CN 101264696 A 9/2008
(Continued)

OTHER PUBLICATIONS

Office Action dated Oct. 10, 2014, in Chinese Patent Application 201210591303.6.
(Continued)

*Primary Examiner* — Manish S Shah
(74) *Attorney, Agent, or Firm* — Oblon, McClelland, Maier & Neustadt, L.L.P.

(57) ABSTRACT

A light beam scanning device scans a luminous flux irradiated from a light source and deflected by a deflector to a scanned surface through an optical system having a set of mirrors. A apparatus, such as the light beam scanning device, further includes a scanning line curve adjusting device to bend a first mirror of the set of mirrors so as to correct a curve in a scanning line on the scanned surface, and a scanning line tilt adjusting device to change orientation of a second mirror of the set of mirrors so as to correct a tilt in the scanning line on the scanned surface. The light beam scanning device may be provided in an image forming apparatus.

16 Claims, 10 Drawing Sheets

(51) Int. Cl.
*H04N 1/047* (2006.01)
*G02B 26/08* (2006.01)
*G02B 26/12* (2006.01)
*G02B 27/00* (2006.01)
*H04N 1/113* (2006.01)
*H04N 1/12* (2006.01)

(52) U.S. Cl.
CPC ....... *G02B 27/0031* (2013.01); *H04N 1/0473* (2013.01); *H04N 1/1135* (2013.01); *H04N 1/12* (2013.01); *H04N 2201/04762* (2013.01)

(58) Field of Classification Search
USPC .......................................................... 347/116
See application file for complete search history.

(56) References Cited

U.S. PATENT DOCUMENTS

| | | |
|---|---|---|
| 2005/0094234 A1 | 5/2005 | Miyatake et al. |
| 2005/0190420 A1 | 9/2005 | Imai et al. |
| 2006/0158711 A1 | 7/2006 | Imai et al. |
| 2007/0058255 A1 | 3/2007 | Imai et al. |
| 2007/0070173 A1 | 3/2007 | Yamakawa et al. |
| 2007/0122192 A1 | 5/2007 | Yamakawa et al. |
| 2007/0134023 A1 | 6/2007 | Shoji et al. |
| 2007/0139745 A1 | 6/2007 | Shoji et al. |
| 2007/0165099 A1 | 7/2007 | Yoshizawa et al. |
| 2007/0236557 A1 | 10/2007 | Imai et al. |
| 2007/0252077 A1 | 11/2007 | Shoji et al. |
| 2008/0019255 A1 | 1/2008 | Imai et al. |
| 2008/0068678 A1 | 3/2008 | Suzuki et al. |
| 2008/0170283 A1 | 7/2008 | Imai |
| 2008/0192323 A1 | 8/2008 | Nakamura et al. |
| 2008/0212155 A1* | 9/2008 | Shoji ............................ 359/198 |
| 2008/0225349 A1 | 9/2008 | Watanabe |
| 2008/0259426 A1 | 10/2008 | Imai |
| 2009/0009826 A1 | 1/2009 | Watanabe |
| 2009/0009840 A1 | 1/2009 | Shoji |
| 2009/0058979 A1 | 3/2009 | Saisho et al. |
| 2009/0073529 A1 | 3/2009 | Imai |
| 2009/0073531 A1 | 3/2009 | Imai |
| 2009/0074437 A1 | 3/2009 | Tanabe et al. |
| 2009/0153934 A1 | 6/2009 | Shoji |
| 2009/0225385 A1 | 9/2009 | Imai |
| 2009/0231654 A1 | 9/2009 | Imai |
| 2009/0295899 A1 | 12/2009 | Watanabe et al. |
| 2009/0303451 A1 | 12/2009 | Miyake et al. |
| 2010/0033787 A1 | 2/2010 | Serizawa et al. |
| 2010/0060963 A1 | 3/2010 | Miyake et al. |
| 2010/0309277 A1 | 12/2010 | Watanabe et al. |
| 2010/0310284 A1 | 12/2010 | Funato et al. |
| 2010/0321461 A1 | 12/2010 | Shoji et al. |
| 2011/0102536 A1 | 5/2011 | Imai |
| 2011/0199663 A1 | 8/2011 | Johno et al. |
| 2011/0199664 A1 | 8/2011 | Serizawa et al. |
| 2011/0310455 A1 | 12/2011 | Serizawa et al. |
| 2011/0316958 A1 | 12/2011 | Johno et al. |
| 2012/0027450 A1 | 2/2012 | Imai |
| 2012/0056968 A1 | 3/2012 | Imai et al. |
| 2012/0062685 A1 | 3/2012 | Serizawa et al. |
| 2012/0182367 A1 | 7/2012 | Masuda et al. |
| 2012/0200655 A1 | 8/2012 | Serizawa et al. |
| 2012/0300008 A1 | 11/2012 | Serizawa et al. |

FOREIGN PATENT DOCUMENTS

| | | |
|---|---|---|
| CN | 101339295 A | 1/2009 |
| CN | 101339296 A | 1/2009 |
| CN | 101907770 A | 12/2010 |
| JP | 2003241128 A * | 8/2003 |
| JP | 2003-270573 A | 9/2003 |
| JP | 2004-191847 | 7/2004 |
| JP | 2005-049468 | 2/2005 |
| JP | 2005-238584 | 9/2005 |
| JP | 2006-17881 | 1/2006 |
| JP | 2006-139200 | 6/2006 |
| JP | 2006-259368 | 9/2006 |
| JP | 2008-216438 | 9/2008 |
| JP | 2008-276010 | 11/2008 |
| JP | 2008-287092 | 11/2008 |

OTHER PUBLICATIONS

Office Action dated Aug. 17, 2015 in Japanese Patent Application No. 2012-000879.

* cited by examiner

REFRACTIVE INDEX

VOLTAGE (V)

| d1 | d2 | d3 | d4 | d5 | d6 | d7 | d8 | d9 | d10 | d11 |
|---|---|---|---|---|---|---|---|---|---|---|
| 46.06 | 3.00 | 47.69 | 12.85 | 3.00 | 108.70 | 46.31 | 13.50 | 89.73 | 3.50 | 141.36 |

(UNIT : mm)

| | BEFORE CORRECTED | EXAMPLE 1 | EXAMPLE 2 |
|---|---|---|---|
| Y |  |  |  |
| M |  |  |  |
| C |  |  |  |
| K |  |  |  |

| | BEFORE CORRECTED | EXAMPLE 3 | EXAMPLE 4 |
|---|---|---|---|
| Y |  |  |  |
| M |  |  |  |
| C |  |  |  |
| K |  |  |  |

LIGHT BEAM SCANNING DEVICE, IMAGE FORMING APPARATUS, AND SCANNING LINE ADJUSTING METHOD

CROSS-REFERENCE TO RELATED APPLICATIONS

This patent application is based on and claims priority pursuant to 35 U.S.C. § 119 to Japanese Patent Application No. 2012-000879, filed on Jan. 6, 2012, in the Japan Patent Office, the entire disclosure of which is hereby incorporated by reference herein.

BACKGROUND

Field of the Invention

The present invention relates to a light beam scanning device, an image forming apparatus, and a scanning line adjusting method, and more particularly to a light beam scanning device that scans a scanned surface with a luminous flux, an image forming apparatus provided with the light beam scanning device, and a method of adjusting a scanning line scanned by the light beam scanning device.

Description of the Related Art

Japanese Patent Application Publication No. 2005-49468-A discloses an optical scanner, which includes a light source, a deflector that deflects a luminous flux irradiated from the light source, and an optical system including a group of optical elements that guides the luminous flux deflected by the deflector to a scanned surface. The curve in a scanning line is corrected by pressing at least one optical element. The tilt in the scanning line is corrected by adjusting the orientation of the at least one optical element.

SUMMARY

The optical scanner described in Japanese Patent Application Publication No. JP-2005-49468-A corrects both of the curve and the tilt of the scanning line at a time through the optical element, it has been difficult to find the best curve or orientation of the optical element that improves accuracy in correcting the curve and the tilt of the scanning line.

In view of the above, one aspect of the present invention is to provide a light beam scanning device that scans a luminous flux to a scanned surface, which includes: a light source to irradiate the luminous flux, a deflector to deflect the luminous flux, an optical system to guide the deflected luminous flux to the scanned surface, the optical system having a set of mirrors. The light beam scanning device further includes a scanning line curve adjusting device to bend a first mirror of the set of mirrors so as to correct a curve in a scanning line on the scanned surface, and a scanning line tilt adjusting device to change orientation of a second mirror of the set of mirrors so as to correct a tilt in the scanning line on the scanned surface. The light beam scanning device may be provided in an image forming apparatus.

One aspect of the present invention is to provide a method of adjusting a scanning line scanned by a light beam scanning device. The light beam scanning device includes: a light source to irradiate a luminous flux; a deflector to deflect the luminous flux irradiated from the light source; and an optical system disposed on an optical path of the deflected luminous flux and to guide the deflected luminous flux to a scanned surface, the optical system having a set of mirrors. The scanning line adjusting method includes: bending a first mirror of the set of mirrors so as to correct a curve in the scanning line on the scanned surface; and changing orientation of a second mirror of the set of mirrors so as to correct a tilt in the scanning line on the scanned surface.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
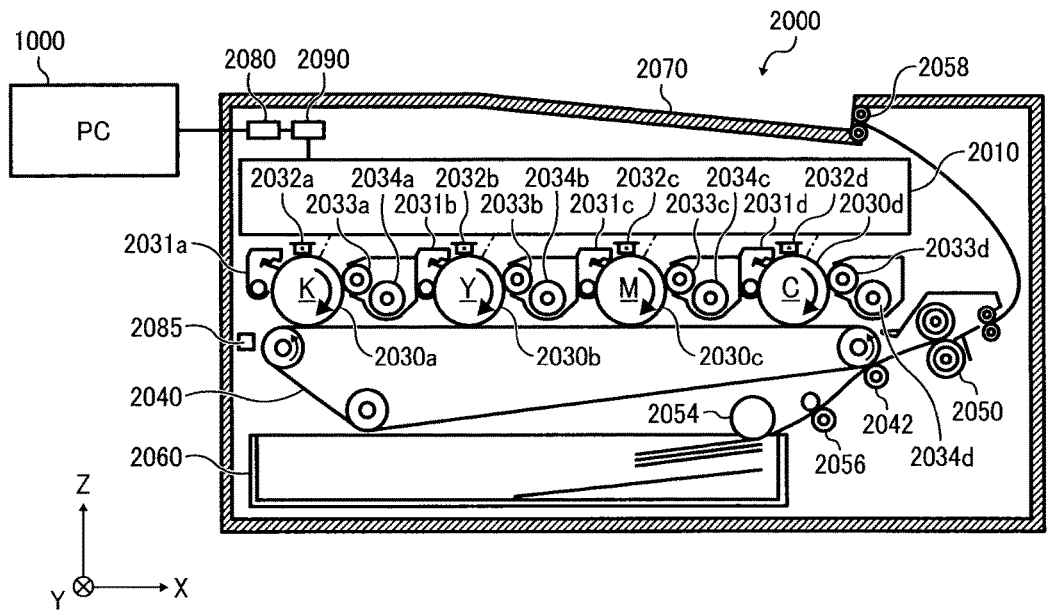
FIG. 1 is a cross-sectional view illustrating a schematic configuration of a color printer including a light beam scanning device according to an example embodiment of the present invention.
Figure 2:
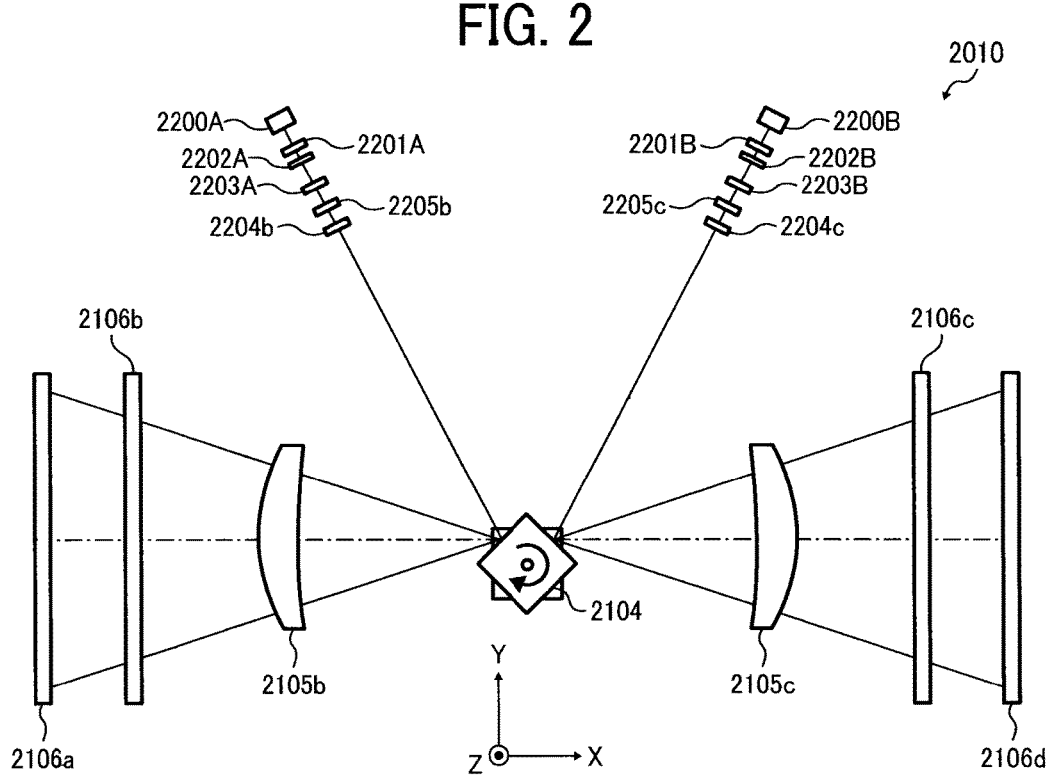
FIG. 2 is a view illustrating a selected portion of the light beam scanning device in FIG. 1.
Figure 3:
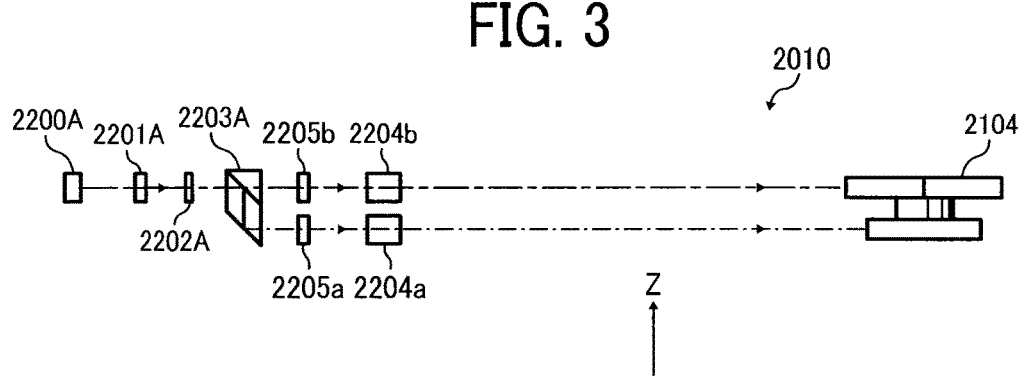
FIG. 3 is another view illustrating the light beam scanning device in FIG. 1.
Figure 4:
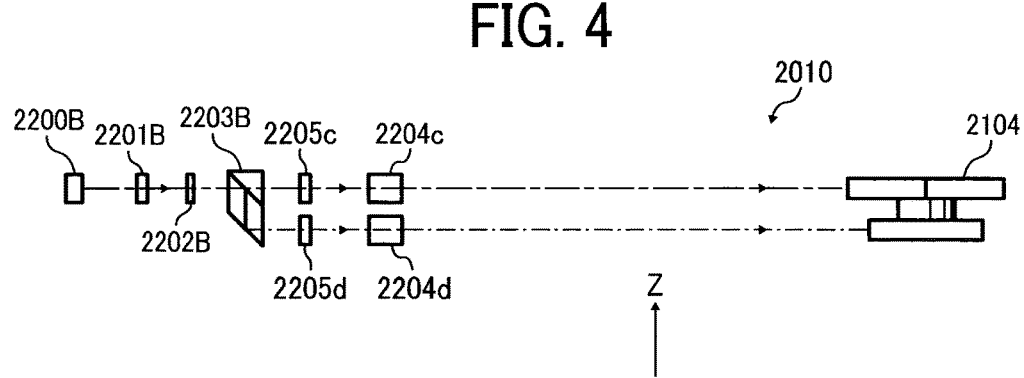
FIG. 4 is still another view illustrating the light beam scanning device in FIG. 1.

The accompanying drawings are intended to depict example embodiments of the present invention and should not be interpreted to limit the scope thereof. The accompanying drawings are not to be considered as drawn to scale unless explicitly noted.

DESCRIPTION OF THE EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Hereinafter, an embodiment of the invention will be described with reference to FIGS. 1 to 16. FIG. 1 illustrates a schematic configuration of a color printer 2000 as an example of the image forming apparatus.

The color printer 2000 in FIG. 1 is a tandem type multi-color printer in which a full-color image is formed by superimposing images of four colors (black, yellow, magenta, and cyan). The color printer 2000 includes a light beam scanning device 2010, four photosensitive drums 2030a, 2030b, 2030c, and 2030d (collectively referred to as the photosensitive drum 2030), four cleaning units 2031a, 2031b, 2031c, and 2031d (collectively referred to as the cleaning unit 2031), four charging devices 2032a, 2032b, 2032c, and 2032d (collectively referred to as the charging device 2032), four development rollers 2033a, 2033b, 2033c, and 2033d (collectively referred to as the development roller 2033), four toner cartridges 2034a, 2034b, 2034c, and 2034d (collectively referred to as the toner cartridge 2034), a transfer belt 2040, a transfer roller 2042, a fixing device 2050, a sheet feed skid (roller) 2054, a registration roller pair 2056, a sheet discharge roller pair 2058, a sheet feed tray 2060, a sheet discharge tray 2070, a communication control device 2080, a misregistration detector 2085, and a printer control device 2090 that controls entire operation of the color printer 2000.

In this example, the XYZ three-dimensional orthogonal coordinate system is used. The Y-axis direction is a direction along a lengthwise direction (rotating shaft direction) of each photosensitive drum. The X-axis direction is a direction along an array direction of the four photosensitive drums. The Z-axis direction extends on a straight line orthogonal to the X-axis direction.

The communication control device 2080 controls bi-directional communication with an upper-node apparatus 1000 (for example, a personal computer) through a network.

The printer control device 2090 includes a CPU, a ROM in which a program described in a CPU-readable code and various kinds of data used in executing the program are stored, a RAM functioning as a work memory, and an A/D conversion circuit that converts analog data into digital data.

The printer control device 2090 transmits image information from the upper-node apparatus to the light beam scanning device 2010.

The photosensitive drum 2030a, the charging device 2032a, the development roller 2033a, the toner cartridge 2034a, and the cleaning unit 2031a constitute an image forming station (hereinafter also referred to as a "K station") that forms a black image.

The photosensitive drum 2030b, the charging device 2032b, the development roller 2033b, the toner cartridge 2034b, and the cleaning unit 2031b constitute an image forming station (hereinafter also referred to as a "Y station") that forms a yellow image.

The photosensitive drum 2030c, the charging device 2032c, the development roller 2033c, the toner cartridge 2034c, and the cleaning unit 2031c constitute an image forming station (hereinafter also referred to as an "M station") that forms a magenta image.

The photosensitive drum 2030d, the charging device 2032d, the development roller 2033d, the toner cartridge 2034d, and the cleaning unit 2031d constitute an image forming station (hereinafter also referred to as a "C station") that forms a cyan image.

The surface of each photosensitive drum 2030, which is formed with a photosensitive layer, functions as a surface to be scanned, i.e., the scanned surface. It is assumed that each photosensitive drum 2030 is rotated in a direction of arrow in FIG. 1 by a rotating mechanism including a driving device.

Each charging device 2032 evenly changes the surface of the corresponding photosensitive drum 2030.

The light beam scanning device 2010 generates a modulated luminous flux in each color based on multicolor image information (black image information, yellow image information, magenta image information, and cyan image information), under control of the printer control device 2090. The light beam scanning device 2010 irradiates the charged surface of the corresponding photosensitive drum 2030 with the modulated luminous flux in each color. Therefore, a latent image corresponding to the image information on each color is formed on the surface of each photosensitive drum 2030. The latent image is transferred in a direction of the corresponding development roller 2033 according to the rotation of the photosensitive drum 2030. The light beam scanning device 2010 is described in detail below.

According to the rotation of the development roller 2033, toner from the corresponding toner cartridge 2034 is evenly applied to the surface of each development roller 2033. As toner comes into contact with the surface of the corresponding photosensitive drum 2030, toner on the surface of each development roller 2033 is transferred and adheres to a surface portion, which is irradiated with the light. That is, each development roller 2033 causes the toner to adhere to and visualize the latent image formed on the surface of the corresponding photosensitive drum 2030. The image (toner image) to which the toner adheres moves in the direction of the transfer belt 2040 according to the rotation of the photosensitive drum 2030.

The black, yellow, magenta, and cyan toner images are sequentially transferred to the transfer belt 2040 at a predetermined timing, and superimposed on one another, thereby forming a multicolor image.

Recording sheets are stored in the sheet feed tray 2060. The sheet feed skid 2054 is disposed near the sheet feed tray 2060. The sheet feed skid 2054 takes out the recording sheet from the sheet feed tray 2060 one by one, and conveys the recording sheet to the registration roller pair 2056. The registration roller pair 2056 delivers the recording sheet to a nip formed between the transfer belt 2040 and the transfer roller 2042 at a predetermined timing. Therefore, the color image on the transfer belt 2040 is transferred to the recording sheet. The recording sheet to which the color image is transferred is delivered to the fixing device 2050.

The fixing device 2050 applies heat and pressure to the recording sheet to fix the toner image onto the recording sheet. The recording sheet to which the toner is fixed is delivered to the sheet discharge tray 2070 through the sheet discharge roller 2058, and sequentially stacked on the sheet discharge tray 2070.

Each cleaning unit 2031 removes the toner (residual toner) remaining on the surface of the corresponding photosensitive drum 2030. The surface of the photosensitive drum 2030 from which the residual toner is removed returns to a position facing the corresponding charging device 2032.

The misregistration detector 2085 is disposed on a −X side of the transfer belt 2040. The misregistration detector 2085 has at least three position detection sensors that are disposed at equal intervals in the Y-axis direction.

Each position detection sensor outputs a signal including positional information that indicates a position at which a toner patch used for position detection is detected, to the printer control device 2090. The toner patch is produced in each station and transferred onto the transfer belt 2040.

The printer control device 2090 detects a tilt and a curve of a scanning line in each station based on an output signal of each position detection sensor of the misregistration detector 2085, for example, as described in Japanese Patent Application Publication No. JP-2004-191847-A (4107578-B), JP-2008-276010-A, and JP-2005-238584-A, the disclosure of each of which is hereby incorporated by reference herein.

The configuration of the light beam scanning device 2010 will be described below.

Figure 11:
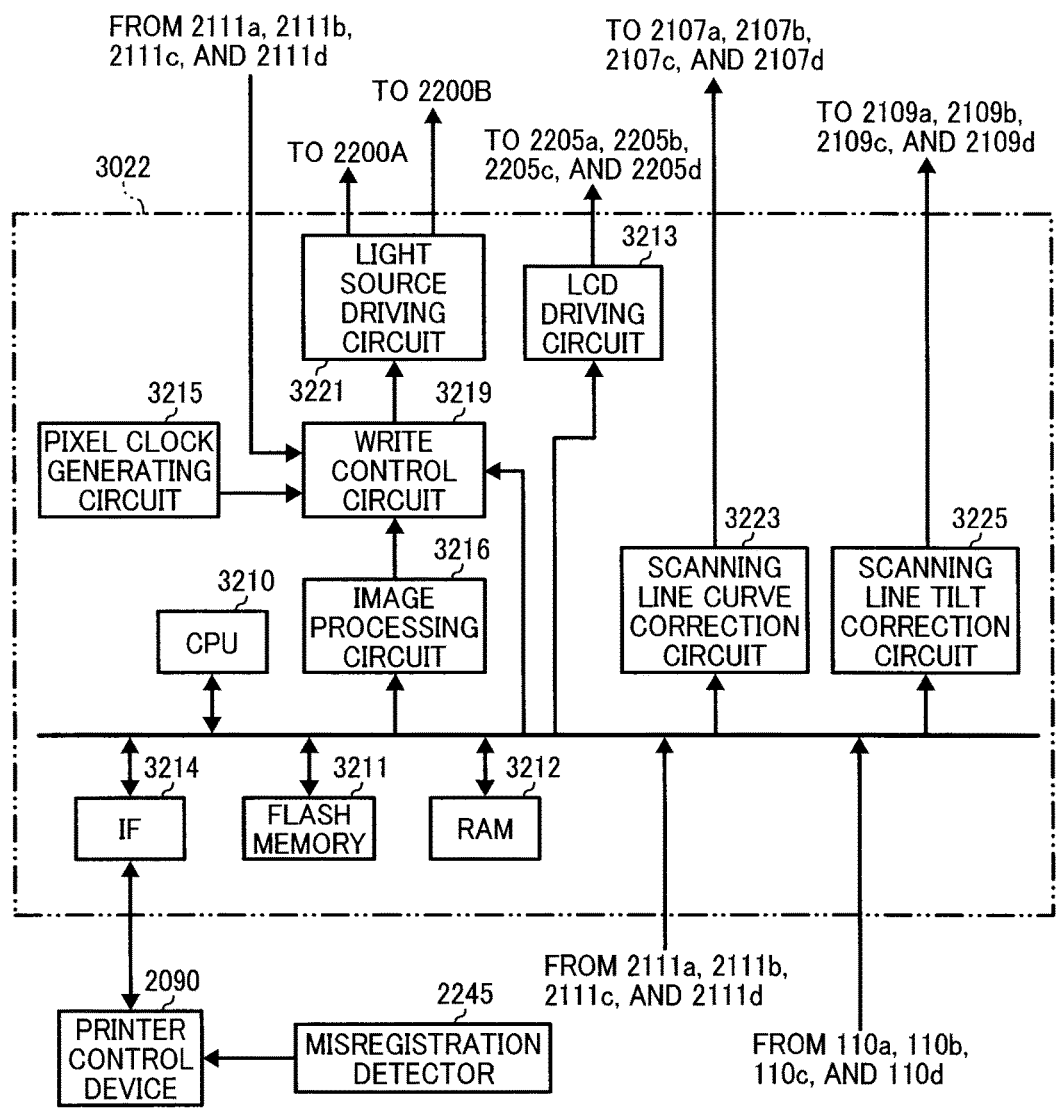
FIG. 11 is a schematic block diagram illustrating a configuration of a scanning control device of the light beam scanning device in FIG. 1.

By way of example, as illustrated in FIGS. 2 to 5, the light beam scanning device 2010 includes two light sources (2200A and 2200B), two coupling lenses (2201A and 2201B), two aperture plates (2202A and 2202B), two luminous flux dividing members (2203A and 2203B), four liquid crystal deflecting elements (2205a, 2205b, 2205c, and 2205d), four cylindrical lenses (2204a, 2204b, 2204c, and 2204d), a polygon mirror 2104, four scanning lenses (2105a, 2105b, 2105c, and 2105d), eight reflection mirrors (2106a, 2106b, 2106c, 2106d, 2108a, 2108b, 2108c, and 2108d), four scanning line curve adjusting devices (2107a, 2107b, 2107c, and 2107d), four scanning line tilt adjusting devices (2109a, 2109b, 2109c, and 2109d), four synchronous mirrors (2110a, 2110b, 2110c, and 2110d), four leading end synchronization detection sensors (2111a, 2111b, 2111c, and 2111d), and a scanning control device 3022 (see FIG. 11). These devices are attached to an optical housing of the light beam scanning device 2010.

Hereinafter, the direction corresponding to a main scanning direction is referred to as a "main scanning direction A", and the direction corresponding to a sub-scanning direction is referred to as a "sub-scanning direction B".

The light source 2200A and the light source 2200B are disposed distant from each other in relation to the X-axis direction.

Figure 6:
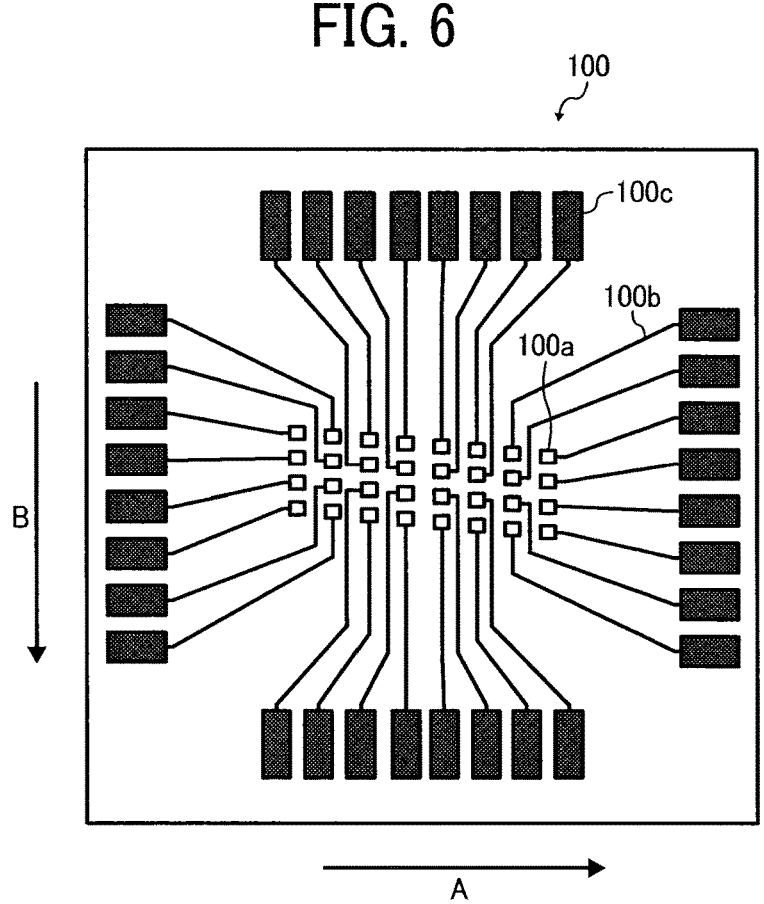
FIG. 6 is a view illustrating a surface emitting laser array chip included in a light source of the light beam scanning device in FIG. 1.

By way of example, as illustrated in FIG. 6, each light source includes a surface emitting laser array chip 100 in which 32 light emitting modules 100a are two-dimensionally arrayed on the same substrate. Each light emitting module 100a is connected to an electrode pad 100c by a wiring member 100b.

The surface emitting laser array chip 100 is formed as follows. That is, plural semiconductor layers are formed on an n-GaAs substrate by an MOCVD method, a mesa is formed by dry etching, selective oxidation is performed, a protective film is added, and an electrode is formed.

Figure 7:
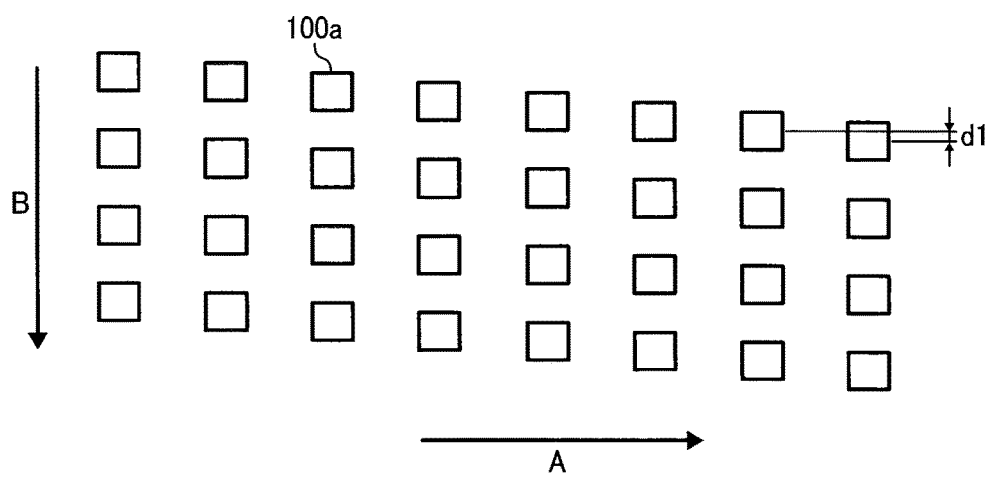
FIG. 7 is a view illustrating an array of plural light emitting modules in the surface emitting laser array chip of FIG. 6.

As illustrated in FIG. 7, the 32 light emitting modules 100a are disposed such that an interval (hereinafter also referred to as a "sub-scanning light emitting module interval") between the light emitting modules becomes an equal interval d1 when all the light emitting modules are orthographically projected onto a virtual line extending in the sub-scanning direction B. As used herein the "light emitting module interval" means a center-to-center distance between the two light emitting modules 100a.

Each light emitting module 100a is a surface emitting laser having an oscillation wavelength of a 780-nm band.

Referring back to FIG. 2, the coupling lens 2201A is disposed on the optical path of the luminous flux emitted from the light source 2200A, and the coupling lens 2201A forms the luminous flux into a substantially parallel luminous flux. The coupling lens 2201B is disposed on the optical path of the luminous flux emitted from the light source 2200B, and the coupling lens 2201B forms the luminous flux into the substantially parallel luminous flux.

The aperture plate 2202A includes an aperture to shape the luminous flux passing through the coupling lens 2201A. The aperture plate 2202B includes an aperture to shape the luminous flux passing through the coupling lens 2201B.

The luminous flux dividing member 2203A is disposed on the optical path of the luminous flux passing through the aperture of the aperture plate 2202A, and the luminous flux dividing member 2203A divides the luminous flux into two luminous fluxes. The luminous flux dividing member 2203B is disposed on the optical path of the luminous flux passing through the aperture of the aperture plate 2202B, and the luminous flux dividing member 2203B divides the luminous flux into two luminous fluxes.

Each luminous flux dividing member 2203 includes a half mirror surface and a reflecting mirror surface. The half mirror surface transmits a half of the incident luminous flux and reflects the other half. The reflecting mirror surface is disposed in parallel with the half mirror surface on the optical path of the luminous flux reflected by the half mirror surface. That is, each luminous flux dividing member 2203 divides the incident luminous flux into the two luminous fluxes parallel to each other.

The liquid crystal deflecting element 2205a is disposed on the optical path of the luminous flux on a +Z side in the two luminous fluxes from the luminous flux dividing member 2203A, and the liquid crystal deflecting element 2205b is disposed on the optical path of the luminous flux on a +Z side in the two luminous fluxes from the luminous flux dividing member 2203A.

The liquid crystal deflecting element 2205c is disposed on the optical path of the luminous flux on the +Z side in the two luminous fluxes from the luminous flux dividing member 2203B, and the liquid crystal deflecting element 2205d is disposed on the optical path of the luminous flux on the −Z side in the two luminous fluxes from the luminous flux dividing member 2203B.

Figure 8A:
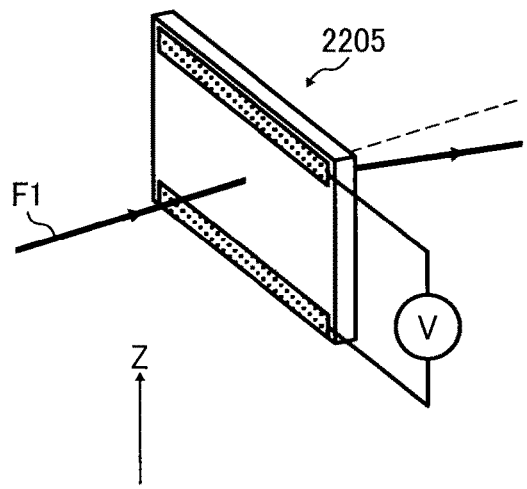
FIG. 8A is a view illustrating a liquid crystal deflecting element in the light beam scanning device in FIG. 1.
Figure 8B:
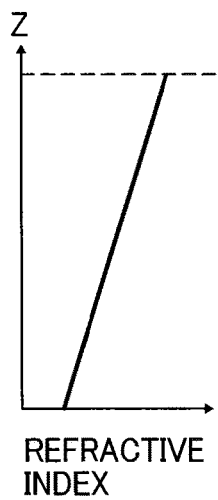
FIGS. 8B to 8D are illustration for explaining changing the direction of the light outgoing axis of the luminous flux, as it passes through a liquid crystal deflecting element of the light beam scanning device in FIG. 1.
Figure 8C:
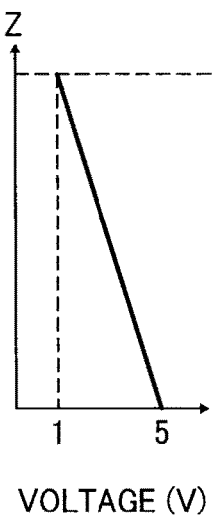
Figure 8D:
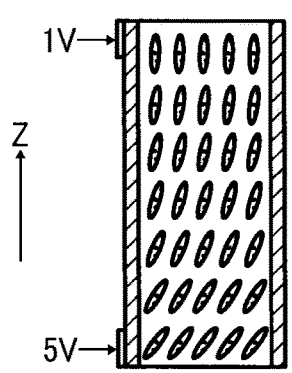

Each liquid crystal deflecting element 2205 can deflect the incident light in the Z-axis direction according to the applied voltage. Each liquid crystal deflecting element 2205 has a configuration in which liquid crystal is sealed between two transparent glass plates. By way of example, as illustrated in FIG. 8A, electrodes are formed in upper and lower portions in the surface of one of the glass plates. In FIG. 8A, an arrow F1 designates the incident luminous flux. When there is a potential difference between the electrodes of the liquid crystal deflecting element 2205, by way of example, the potential gradient is generated in the Z-axis direction as illustrated in FIG. 8C. As illustrated in FIG. 8D, this potential gradient causes the change in alignment of the liquid crystal. As a result, the gradient of a refractive index is generated in the Z-axis direction (see FIG. 8A). Therefore, like a prism, a light outgoing axis can slightly be tilted in the Z-axis direction. For example, nematic liquid crystal having dielectric anisotropy is used as the liquid crystal.

The cylindrical lens 2204a is disposed on the optical path of the luminous flux through the liquid crystal deflecting element 2205a, and the cylindrical lens 2204b is disposed on the optical path of the luminous flux through the liquid crystal deflecting element 2205b.

The cylindrical lens 2204c is disposed on the optical path of the luminous flux through the liquid crystal deflecting element 2205c, and the cylindrical lens 2204d is disposed on the optical path of the luminous flux through the liquid crystal deflecting element 2205d.

In each cylindrical lens 2204, an optical surface on one side has a flat surface, and an optical surface on the other side has a common curvature in the Z-axis direction. The cylindrical lenses 2204a to 2204d are disposed such that optical path lengths to a position at which the luminous flux is deflected and reflected by the polygon mirror 2104 become equal to one another.

Each cylindrical lens 2204 has strong power in the Z-axis direction, and forms a long line image in the main scanning direction A near a deflecting and reflecting surface of the polygon mirror 2104.

The polygon mirror 2104 includes a four-surface mirror having a two-stage structure, and each mirror constitutes the deflecting and reflecting surface.

The luminous flux from the cylindrical lens 2204a and the luminous flux from the cylindrical lens 2204d are deflected by the first-stage (lower-stage) four-surface mirror, and the luminous flux from the cylindrical lens 2204b and the luminous flux from the cylindrical lens 2204c are deflected by the second-stage (upper-stage) four-surface mirror.

The luminous fluxes from the cylindrical lenses 2204a and 2204b are deflected onto the −X side of the polygon mirror 2104, and the luminous fluxes from the cylindrical lenses 2204c and 2204d are deflected onto the +X side of the polygon mirror 2104.

The first-stage four-surface mirror and the second-stage four-surface mirror are set such that the deflecting and reflecting surface in the first-stage four-surface mirror is not parallel to the deflecting and reflecting surface in the second-stage four-surface mirror. In this example, when viewed in the Z-axis direction, the first-stage four-surface mirror and the second-stage four-surface mirror rotate while being deviated from each other by 45° (see FIG. 2), and the first-stage four-surface mirror and the second-stage four-surface mirror alternately scan to perform writing. Therefore, the scanning can be performed to two photosensitive drums by one light source.

A groove is provided between the first-stage four-surface mirror and the second-stage four-surface mirror in order to reduce a wind loss. Each four-surface mirror has a size (a thickness) of about 2 mm in the Z-axis direction.

The scanning lenses 2105a and 2105b are disposed on the −X side of the polygon mirror 2104, and the scanning lenses 2105c and 2105d are disposed on the +X side of the polygon mirror 2104.

The scanning lenses 2105a and 2105b are stacked in the Z-axis direction, the scanning lens 2105a faces the first-stage four-surface mirror, and the scanning lens 2105b faces the second-stage four-surface mirror. The scanning lenses 2105a and 2105b may integrally be molded.

The scanning lenses 2105c and 2105d are stacked in the Z-axis direction, the scanning lens 2105c faces the second-stage four-surface mirror, and the scanning lens 2105d faces the first-stage four-surface mirror. The scanning lenses 2105c and 2105d may integrally be molded.

The photosensitive drum 2030a is irradiated with the luminous flux from the cylindrical lens 2204a, which is deflected by the polygon mirror 2104, through the scanning lens 2105a, the reflection mirror 2106a, and the reflection mirror 2108a, and an optical spot is formed on the photosensitive drum 2030a.

The photosensitive drum 2030b is irradiated with the luminous flux from the cylindrical lens 2204b, which is deflected by the polygon mirror 2104, through the scanning lens 2105b, the reflection mirror 2106b, and the reflection mirror 2108b, and the optical spot is formed on the photosensitive drum 2030b.

The photosensitive drum 2030c is irradiated with the luminous flux from the cylindrical lens 2204c, which is deflected by the polygon mirror 2104, through the scanning lens 2105c, the reflection mirror 2106c, and the reflection mirror 2108c, and the optical spot is formed on the photosensitive drum 2030c.

The photosensitive drum 2030d is irradiated with the luminous flux from the cylindrical lens 2204d, which is deflected by the polygon mirror 2104, through the scanning lens 2105d, the reflection mirror 2106d, and the reflection mirror 2108d, and the optical spot is formed on the photosensitive drum 2030d.

The optical spot on each photosensitive drum 2030 moves in the lengthwise direction of the photosensitive drum 2030 according to the rotation of the polygon mirror 2104, and therefore the scanning line is formed on the photosensitive drum 2030. In this example, the optical spot moving direction is the "main scanning direction" and the photosensitive drum rotating direction is the "sub-scanning direction".

Further, in each photosensitive drum 2030, a scanning region in the main scanning direction, in which the image information is written, is referred to as an "effective scanning region", an "image forming region", or an "effective image region".

The reflection mirrors 2106a to 2106d are disposed such that the optical path lengths from the polygon mirror 2104 to the photosensitive drums 2030 are equal to one another and such that the incident positions and the incident angles of the luminous fluxes in the photosensitive drums 2030 are equal to one another.

The optical system disposed on the optical path between the polygon mirror 2104 and each photosensitive drum 2030 is also called a scanning optical system. In this example, the scanning lens 2105a and the reflection mirrors (2106a and 2108a) constitute the scanning optical system of the K station. The scanning lens 2105b and the reflection mirrors (2106b and 2108b) constitute the scanning optical system of the Y station. The scanning lens 2105c and the reflection mirrors (2106c and 2108c) constitute the scanning optical system of the M station. The scanning lens 2105d and the reflection mirrors (2106d and 2108d) constitute the scanning optical system of the C station.

The photosensitive drum 2030 located on the −X side of the polygon mirror 2104 and the photosensitive drum 2030 located on the +X side of the polygon mirror 2104 are identical to each other in the rotating direction of the polygon mirror 2104. Therefore, the moving directions of the optical spots are opposite to each other, and the latent image is formed such that a write starting position on one side agrees with a write ending position on the other side in the Y-axis direction.

Figures 9, 10:
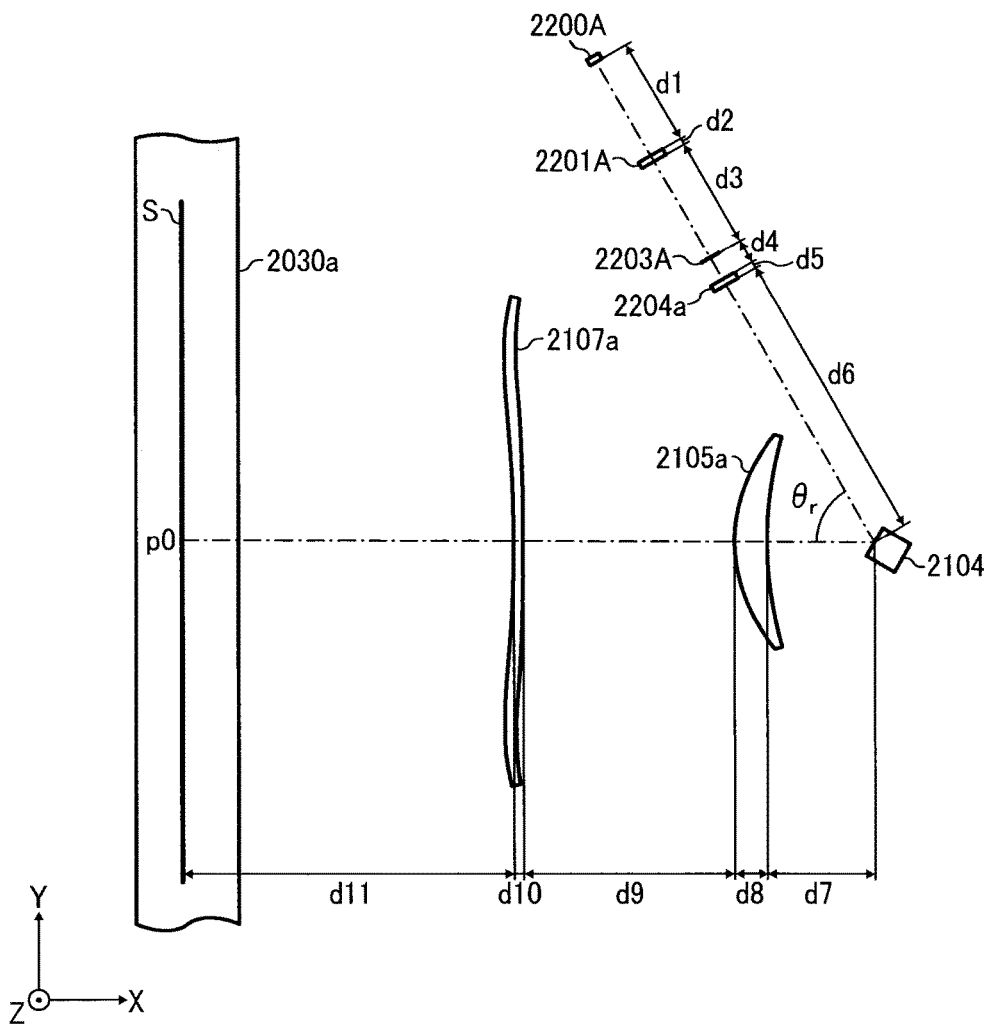
FIG. 9 is a view illustrating a positional relationship among optical elements in the light beam scanning device in FIG. 1.
FIG. 10 is a table illustrating example values of distances indicating the positional relationship in FIG. 9.

FIG. 9 illustrates a positional relationship among the optical elements in the K station. FIG. 10 illustrates an example of specific values of the numerals d1 to d11 in FIG. 9. The same positional relationship holds in other stations.

An angle (θr in FIG. 9) formed between a direction in which the luminous flux is output from the cylindrical lens 2204$a$, and the direction in which the luminous flux travels from the deflecting and reflecting surface of the polygon mirror 2104 toward a position (the numeral p0 in FIG. 9) of an image height of zero in the surface of the photosensitive drum 2030$a$ is 60 degrees.

Figure 5:
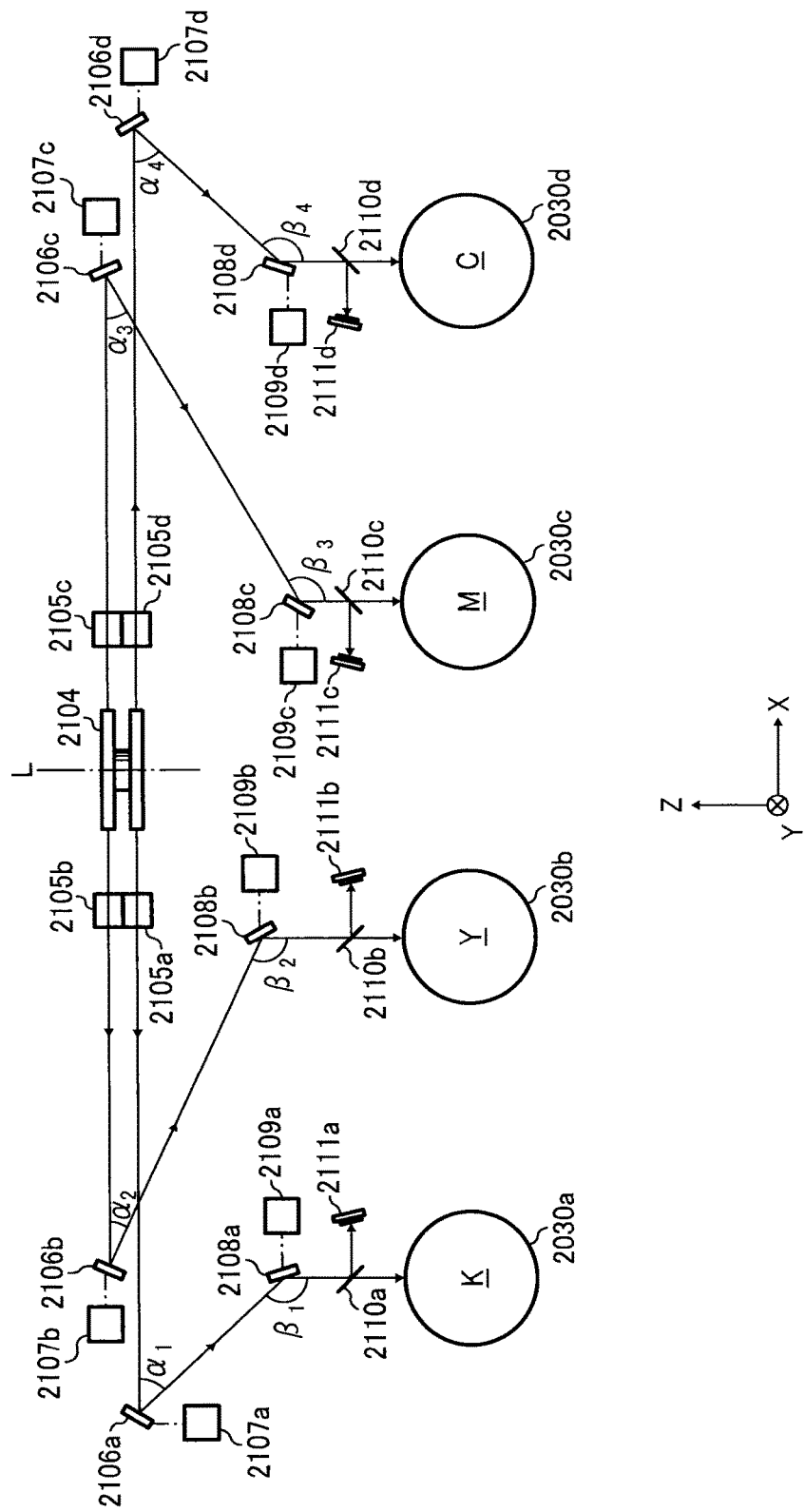
FIG. 5 is yet another view illustrating the light beam scanning device in FIG. 1.

Referring to FIG. 5, before image writing is started, the luminous flux passing through the scanning optical system of the K station is partially received by the leading end synchronization detection sensor 2111$a$ through the synchronous mirror 2110$a$.

Before image writing is started, the luminous flux passing through the scanning optical system of the Y station is partially received by the leading end synchronization detection sensor 2111$b$ through the synchronous mirror 2110$b$.

Before writing is started, the luminous flux passing through the scanning optical system of the M station is partially received by the leading end synchronization detection sensor 2111$c$ through the synchronous mirror 2110$c$.

Before writing is started, the luminous flux passing through the scanning optical system of the C station is partially received by the leading end synchronization detection sensor 2111$d$ through the synchronous mirror 2110$d$.

Each leading end synchronization detection sensor 2111 outputs a signal to the scanning control device 3022 according to a level of light received ("light receiving level"). The output signal of each leading end synchronization detection sensor 2111 is also called a "leading end synchronizing signal".

Each leading end synchronization detection sensor 2111 is disposed at a position optically substantially equivalent to the surface of the corresponding photosensitive drum 2030. In this case, a beam diameter of the luminous flux moving on the light receiving surface of the leading end synchronization detection sensor 2111 can be reduced to improve sensing accuracy.

Each leading end synchronization detection sensor 2111 is set such that the direction normal to the light receiving surface is tilted by 3 to 5° with respect to the light incident direction. Therefore, the light multiply reflected between a lead frame and a cover glass in the leading end synchronization detection sensor 2111 is guided to the outside of the sensor. As a result, the degradation of the sensing accuracy can be suppressed. In this case, the return of the light, which is reflected by the surface of the leading end synchronization detection sensor 2111, to the light source can be suppressed. As a result, APC (Auto Power Control) can accurately be performed.

By way of example, as illustrated in FIG. 11, the scanning control device 3022 includes a CPU 3210, a flash memory 3211, a RAM 3212, a liquid crystal element (LCD) driving circuit 3213, an IF (interface) 3214, a pixel clock generating circuit 3215, an image processing circuit 3216, a write control circuit 3219, a light source driving circuit 3221, a scanning line curve correction circuit 3223, and a scanning line tilt correction circuit 3225. In FIG. 11, arrows indicate a flow of a typical signal or information, but the arrows do not indicate all the connection relationships among blocks.

The pixel clock generating circuit 3215 generates a pixel clock signal. In the pixel clock signal, phase modulation can be performed with resolution of ⅛ clock.

After the CPU 3210 performs raster expansion to image data in each color, the image processing circuit 3216 performs predetermined halftone processing to the image data, and produces dot data in each light emitting module of the light source.

The write control circuit 3219 obtains write starting timing in each station based on the leading end synchronizing signal. On the write starting timing, the dot data from each light emitting module is superimposed on the pixel clock signal from the pixel clock generating circuit 3215, and modulated data is independently produced in each light emitting module. The write control circuit 3219 performs the APC (Auto Power Control) in predetermined timing.

The light source driving circuit 3221 outputs a driving signal of each light emitting module to each light source according to each piece of modulated data from the write control circuit 3219.

The LCD driving circuit 3213 applies an applied voltage, which is determined by the CPU 3210, to each liquid crystal deflecting element.

The IF (interface) 3214 controls the bi-directional communication with the printer control device 2090.

Various programs, which are described in a code that can be read by the CPU 3210, and various kinds of data used in executing the programs are stored in the flash memory 3211.

The RAM 3212 is a work memory.

The CPU 3210 is operated according to the program stored in the flash memory 3211, and controls entire operation of the light beam scanning device 2010.

Based on the scanning line curve in each station, which is detected by the printer control device 2090, the scanning line curve correction circuit 3223 separately controls four scanning line curve adjusting devices 2107$a$ to 2107$d$ as described in detail later, and separately corrects the scanning line curve in the station.

Based on the scanning line tilt in each station, which is detected by the printer control device 2090, the scanning line tilt correction circuit 3225 separately controls four scanning line tilt adjusting devices 2109$a$ to 2109$d$ as described in detail later, and separately corrects the scanning line tilt in the station.

For example, the scanning line curve adjusting devices 2107$a$ to 2107$d$ adjust production errors of the optical members, such as the scanning lens, which constitute the scanning optical system and the scanning line curve caused by an assembly error. For example, the scanning line tilt adjusting devices 2109$a$ to 2109$d$ adjust the production errors of the optical members, such as the scanning lens, which constitute the scanning optical system and the scanning line tilt caused by the assembly error.

The curve and the tilt of the scanning line cause banding, color unevenness, and density unevenness in the finally-formed image.

As illustrated in FIG. 5, the scanning line curve adjusting devices 2107$a$ to 2107$d$ are provided according to the reflection mirrors 2106$a$ to 2106$d$, respectively. Hereinafter, the scanning line curve adjusting devices 2107$a$ to 2107$d$ are collectively referred to as a scanning line curve adjusting device 2107 unless otherwise noted. The reflection mirrors 2106$a$ to 2106$d$ are collectively referred to as a reflection mirror 2106 unless otherwise noted.

Figure 12:
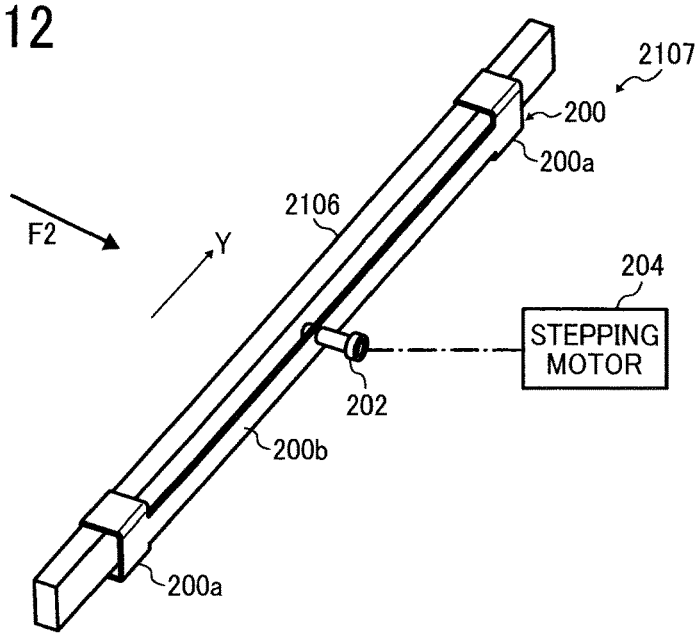
FIG. 12 is a view illustrating a scanning line curve adjusting device of the light beam scanning device in FIG. 1.

By way of example, as illustrated in FIG. 12, the reflection mirror 2106 is constructed by a long and thin plate-like member in which the Y-axis direction is set to the lengthwise direction, and the surface on one side is used as the reflecting surface. In FIG. 12, an arrow F2 indicates the traveling direction of the luminous flux.

By way of example, the scanning line curve adjusting device 2107 includes a retaining member 200 that retains the reflection mirror 2106, an adjust screw 202, and a stepping motor 204.

By way of example, the retaining member 200 includes a pair of retaining modules 200a that separately retains one end portion and the other end portion in the lengthwise direction of the reflection mirror 2106 and a coupling module 200b that extends in the Y-axis direction to couple the pair of retaining modules 200a. A screw hole is made in a central portion in the Y-axis direction of the coupling module 200b, and the adjust screw 202 is engaged in the screw hole.

When the adjust screw 202 is screwed, the reflection mirror 2106 is pressed from a rear surface (the opposite surface to the reflecting surface), and curved (bent) so as to have the curvature in the main scanning direction A (the Y-axis direction). A secondary component included in the scanning line curve can be adjusted by curving the reflection mirror 2106. Hereinafter, the "scanning line curve" means the secondary component included in the scanning line curve unless otherwise noted.

The adjust screw 202 is configured to be rotated by the stepping motor 204. Therefore, the reflection mirror 2106 is curved by controlling the drive of the stepping motor 204, which allows the adjustment of the scanning line curve. The scanning line curve correction circuit 3223 of the scanning control device 3022 controls the drive of the stepping motor 204.

Specifically, the scanning line curve correction circuit 3223 obtains a scanning line curve amount in the K station from the scanning line curve, which is detected by the printer control device 2090 based on the output signal of each position detection sensor. The scanning line curve correction circuit 3223 controls the drive of the stepping motor 204 corresponding to the reflection mirror 2106a such that the scanning line curve amount becomes substantially zero.

The scanning line curve correction circuit 3223 obtains the scanning line curve amount in the Y station from the scanning line curve, which is detected by the printer control device 2090 based on the output signal of each position detection sensor, and the scanning line curve correction circuit 3223 controls the drive of the stepping motor 204 corresponding to the reflection mirror 2106b such that the scanning line curve amount becomes substantially zero.

The scanning line curve correction circuit 3223 obtains the scanning line curve amount in the M station from the scanning line curve, which is detected by the printer control device 2090 based on the output signal of each position detection sensor, and the scanning line curve correction circuit 3223 controls the drive of the stepping motor 204 corresponding to the reflection mirror 2106c such that the scanning line curve amount becomes substantially zero.

The scanning line curve correction circuit 3223 obtains the scanning line curve amount in the C station from the scanning line curve, which is detected by the printer control device 2090 based on the output signal of each position detection sensor, and the scanning line curve correction circuit 3223 controls the drive of the stepping motor 204 corresponding to the reflection mirror 2106d such that the scanning line curve amount becomes substantially zero.

Thus, based on the scanning line curve in each station, which is detected by the printer control device 2090, the scanning line curve correction circuit 3223 separately drives the stepping motor of the corresponding scanning line curve adjusting device 2107, thereby separately correcting the scanning line curve in the station. As described in detail later, the reflection mirror 2106 is curved more with increasing adjustment amount of the scanning line curve.

Figure 15:
FIG. 15 is an illustration for explaining example operation of correcting a scanning line curve performed by the scanning control device of the light beam scanning device in FIG. 1.
Figure 15:
Figure 15:
Figure 15:
Figure 15:
Figure 15:
Figure 15:
Figure 15:
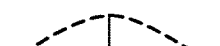
Figure 15:
Figure 15:
Figure 15:
Figure 15:

As illustrated in FIG. 15, it is assumed that the scanning line having the same shape as the scanning line formed on the photosensitive drum (the photosensitive drum 2030b of the Y station in FIG. 15) in one station is formed on the photosensitive drums of the other three stations. For example, as illustrated in the "BEFORE CORRECTED" in FIG. 15, when the curve direction of the scanning line formed on the photosensitive drum of one station differs from the curve directions of the scanning lines formed on the photosensitive drums of the other three stations (when the curve direction of the scanning line formed on the photosensitive drum of one station is opposite to the curve directions of the scanning lines formed on the photosensitive drums of the other three stations), it would be necessary to increase the adjustment amount of the scanning line by the scanning line curve adjusting device 2107, namely, the curvature of the reflection mirror 2106 in the first example case ("EXAMPLE 1") using the background technique. As a result, an aberration of the reflection mirror 2106 increases to degrade optical performance of the scanning optical system. On the other hand, in this example "EXAMPLE 2", because the scanning line curve in each station can separately be corrected, the adjustment amount of the scanning line in each station, namely, the curvature of the reflection mirror 2106 can be decreased, and therefore the increase in aberration of the reflection mirror 2106 can be suppressed. As a result, the degradation of the optical performance of the scanning optical system can be suppressed.

Figure 16:
FIG. 16 is an illustration for explaining another example operation of correcting a scanning line curve performed by the scanning control device of the light beam scanning device in FIG. 1.
Figure 16:
Figure 16:
Figure 16:
Figure 16:
Figure 16:
Figure 16:
Figure 16:
Figure 16:
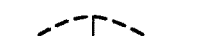
Figure 16:
Figure 16:
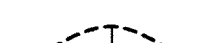
Figure 16:
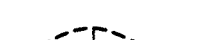

As illustrated in FIG. 16, when correcting the scanning line curve, the scanning line curve correction circuit 3223 may leave the scanning line curve (secondary component) to such an extent that the scanning line curve does not influence the image. In this case, the adjustment amount of the scanning line curve can be decreased compared with the case that scanning line curve is corrected such that the curve is eliminated, namely, such that the secondary component is corrected to the straight line as illustrated in FIG. 15. As a result, the increase in aberration due to the increase in curvature of the reflection mirror 2106 can be further suppressed, and therefore the degradation of the optical performance of the scanning optical system can be further suppressed.

In this example, the scanning line curve adjusting device 2107 does not adjust high-order components of a tertiary component or more, which are included in the scanning line curve. For example, the secondary component may have one extremum, and the scanning line may have a V-shape or an inverted V-shape. In the case that the secondary component is corrected to the straight line, one pressing module (adjust screw) should be enough to press the reflection mirror 2106 as described above. On the other hand, for example, the tertiary component may have two extrema, and the scanning line may have an S-shape (Z-shape). In the case that the tertiary component is to be corrected to the straight line, it is necessary to press the reflection mirror 2106 using at least three pressing modules (adjust screws), and the configuration and the control become troublesome compared with the correction of the secondary component. In another example, a quaternary component may have three extrema, and the scanning line may have an M-shape or a W-shape. Therefore, in the case that the quaternary component is to be corrected to the straight line, it is necessary to press the reflection mirror 2106 using at least three pressing modules (adjust screws), and the configuration and the control become troublesome compared with the correction of the tertiary component. In the case that a quintic component or more is corrected to the straight line, the configuration and the control become troublesome compared with the correction of the quaternary component. For this reasons, in this example, only the secondary component in the scanning line curve is corrected.

As illustrated in FIG. 5, the scanning line tilt adjusting devices 2109a to 2109d are provided so as to face the reflection mirrors 2108a to 2108d, respectively. Hereinafter, the scanning line tilt adjusting devices 2109a to 2109d are collectively referred to as a scanning line tilt adjusting device 2109 unless otherwise noted. The reflection mirrors 2108a to 2108d are collectively referred to as a reflection mirror 2108 unless otherwise noted.

Figure 13:
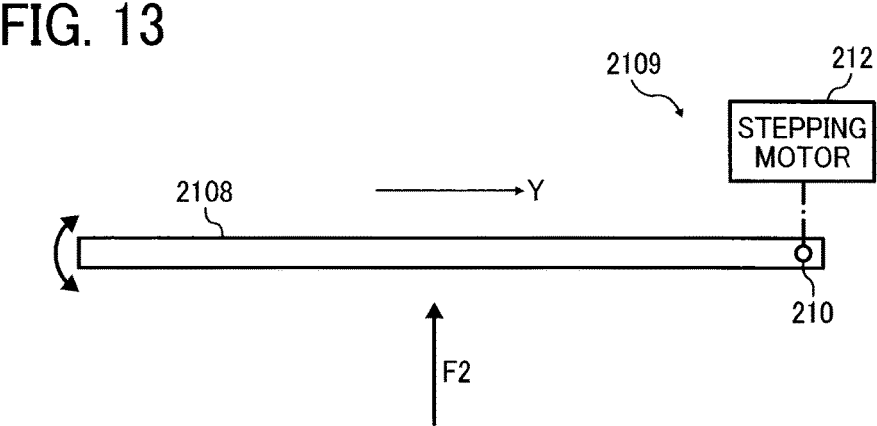
FIG. 13 is a view illustrating a scanning line tilt adjusting device of the light beam scanning device in FIG. 1.

By way of example, as illustrated in FIG. 13, the reflection mirror 2108 is constructed by a long and thin plate-like member in which the Y-axis direction is set to the lengthwise direction, and the surface on one side is used as the reflecting surface. In FIG. 13, the arrow F2 indicates the traveling direction of the luminous flux.

By way of example, the scanning line tilt adjusting device 2109 includes a rotating shaft 210 that supports one end portion in the lengthwise direction of the reflection mirror 2108 and a stepping motor 212. In this example, the rotating shaft 210 extends in the main scanning direction A (the Y-axis direction) and the direction orthogonal to the traveling direction of the luminous flux. Alternatively, the rotating shaft 210 may extend in the direction other than that of FIG. 13, as long as the extending direction is not parallel to either the main scanning direction A or the traveling direction of the luminous flux.

The rotating shaft 210 is rotated by the stepping motor 212 to turn the reflection mirror 2108, whereby the tilt of the reflection mirror 2108 changes with respect to the traveling direction of the luminous flux. Therefore, by controlling the drive of the stepping motor 212, the reflection mirror 2108 is turned, namely, an attitude (the tilt with respect to the traveling direction of the luminous flux) of the reflection mirror 2108 is changed, and the scanning line tilt can be adjusted. The scanning line tilt correction circuit 3225 of the scanning control device 3022 controls the drive of the stepping motor 212.

Specifically, the scanning line tilt correction circuit 3225 obtains a scanning line tilt amount in the K station from the scanning line tilt, which is detected by the printer control device 2090 based on the output signal of each position detection sensor, and the scanning line tilt correction circuit 3225 controls the drive of the stepping motor 212 corresponding to the reflection mirror 2108a such that the scanning line tilt amount becomes substantially zero.

The scanning line tilt correction circuit 3225 obtains a scanning line tilt amount in the Y station from the scanning line tilt, which is detected by the printer control device 2090 based on the output signal of each position detection sensor, and the scanning line tilt correction circuit 3225 controls the drive of the stepping motor 212 corresponding to the reflection mirror 2108b such that the scanning line tilt amount becomes substantially zero.

The scanning line tilt correction circuit 3225 obtains a scanning line tilt amount in the M station from the scanning line tilt, which is detected by the printer control device 2090 based on the output signal of each position detection sensor, and the scanning line tilt correction circuit 3225 controls the drive of the stepping motor 212 corresponding to the reflection mirror 2108c such that the scanning line tilt amount becomes substantially zero.

The scanning line tilt correction circuit 3225 obtains a scanning line tilt amount in the C station from the scanning line tilt, which is detected by the printer control device 2090 based on the output signal of each position detection sensor, and the scanning line tilt correction circuit 3225 controls the drive of the stepping motor 212 corresponding to the reflection mirror 2108d such that the scanning line tilt amount becomes substantially zero.

Thus, based on the scanning line tilt in each station, which is detected by the printer control device 2090, the scanning line tilt correction circuit 3225 separately drives the stepping motor 212 of the corresponding scanning line tilt adjusting device 2109, thereby separately correcting the scanning line tilt in the station. As described in detail later, it may be necessary to largely curve the reflection mirror 2106 in the traveling direction of the luminous flux with increasing adjustment amount of the scanning line tilt.

It is assumed that the scanning line having the same shape as the scanning line formed on the photosensitive drum in one station is formed on the photosensitive drums of the other three stations. For example, when the tilt of the scanning line formed on the photosensitive drum of one station differs largely from the tilts of the scanning lines formed on the photosensitive drums of the other three stations (when the tilt of the scanning line formed on the photosensitive drum of one station is opposite to the tilts of the scanning lines formed on the photosensitive drums of the other three stations), if the background technique is used, it is necessary to increase the adjustment amount of the scanning line by the scanning line tilt adjusting device 2109, namely, the tilt of the reflection mirror 2108 with respect to the traveling direction of the luminous flux. As a result, a deviation of the optical path length increases with respect to the reflection mirror 2108 to degrade the optical performance of the scanning optical system. In contrary, in this embodiment, as described above, because the scanning line tilt in each station can separately be corrected, the adjustment amount of the scanning line in each station, namely, the tilt of the reflection mirror 2108 can be decreased with respect to the traveling direction of the luminous flux, and therefore the increase in deviation of the optical path length with respect to the reflection mirror 2108 can be suppressed. As a result, the degradation of the optical performance of the scanning optical system can be suppressed.

Figure 14:
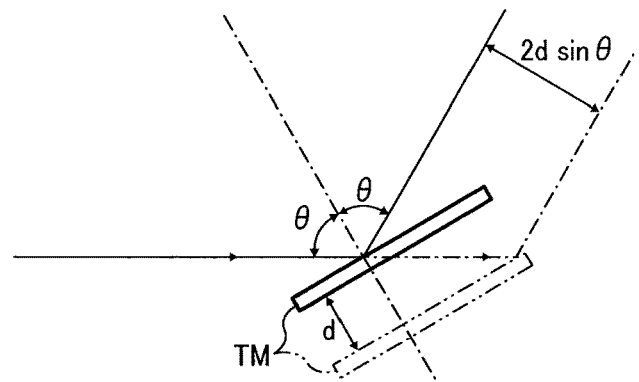
FIG. 14 is a view illustrating a relationship among a displacement amount of a reflection mirror, an incident angle of a luminous flux to the reflection mirror, and an adjustment amount of a scanning line of the light beam scanning device in FIG. 1.

Referring to FIG. 14, assuming that $\theta$ is an incident angle of the luminous flux to a reflection mirror TM, and that d is a displacement amount of the reflecting surface when the reflection mirror TM is curved or when the reflection mirror TM is turned, the displacement amount of the scanning line is $2d \sin \theta$. That is, when the reflecting surface of the reflection mirror TM is displaced by the displacement amount d, the scanning line is displaced by the displacement amount $2d \sin \theta$.

In this case, the displacement amount $2d \sin \theta$ of the scanning line increases with increasing displacement amount d and with increasing incident angle $\theta$. However, when the displacement amount d increases excessively, the curvature of the reflection mirror TM increases to increase the aberration, or the tilt of the reflection mirror TM increases to increase the deviation of the optical path length, which results in the degradation of the optical performance of the scanning optical system. Therefore, desirably the incident angle θ increases as much as possible in order that the adjustment amount of the scanning line is obtained while the degradation of the optical performance of the scanning optical system is suppressed.

Usually it would be necessary that the adjustment amount of the scanning line tilt be about one digit larger than the adjustment amount of the scanning line curve (for example, the tilt adjustment amount of hundreds of micrometers and the curve adjustment amount of tens of micrometers).

In this example, as illustrated in FIG. 5, the incident angle of the luminous flux to the reflection mirror 2108 in each station is set larger than the incident angle of the luminous flux to the reflection mirror 2106, whereby the tilt of the reflection mirror 2108, which is necessary to adjust the tilt of the scanning line, is decreased as much as possible with respect to the traveling direction of the luminous flux. As a result, the deviation of the optical path length of the luminous flux can be decreased with respect to the reflection mirror 2108 to suppress the degradation of the optical performance of the scanning optical system.

Specifically, relationships of $\alpha_1 < \beta_1$, $\alpha_2 < \beta_2$, $\alpha_3 < \beta_3$, and $\alpha_4 < \beta_4$ hold in FIG. 5. $\alpha_1$ to $\alpha_4$ are deflection angles (a sum of the incident angle and the reflecting angle) of the luminous flux for the reflection mirrors 2106a to 2106d, and $\beta_1$ to $\beta_4$ are deflection angles (the sum of the incident angle and the reflecting angle) of the luminous flux for the reflection mirrors 2108a to 2108d.

In this example, the deflection angle $\beta_2$ of the luminous flux for the reflection mirror 2108b of the Y station is set smaller than the deflection angles $\beta_1$, $\beta_3$, and $\beta_4$ of the luminous flux for the reflection mirrors 2108a, 2108c, and 2108d of the other stations. That is, the relationships of $\beta_2 < \beta_1$, $\beta_2 \beta_3$, and $\beta_2 < \beta_4$ hold. This is because, even if the adjustment amount of the scanning line in the Y station that forms the yellow image is decreased compared with the scanning lines in the other stations, the color shift is hardly conspicuous and the image is hardly influenced.

In the case that the stations differ from each other in the scanning line curve direction, the color shift is generated when the image is output. The scanning line partially constituting the scanning optical system contributes particularly to the scanning line curve direction.

Therefore, in this example, the scanning optical systems of the two stations corresponding to each other are configured and disposed (laid out) such that the scanning line curve directions of the two stations are aligned with (identical to) each other.

That is, the scanning lens 2105a of the scanning optical system in the K station is substantially equal to the scanning lens 2105d of the scanning optical system in the C station, and the scanning lenses 2105a and 2105d are symmetrically disposed in relation to a plane L, which includes an axis line of the rotating shaft of the polygon mirror 2104 and is parallel to the YZ-plane, as illustrated in FIG. 5. The scanning lens 2105b of the scanning optical system in the Y station is substantially equal to the scanning lens 2105c of the scanning optical system in the M station, and the scanning lenses 2105b and 2105c are symmetrically disposed in relation to the plane L.

Each scanning optical system has the two reflection mirrors.

Therefore, the scanning line curve directions of the two stations corresponding to each other can be aligned with each other, and the color shift is hardly conspicuous. The reason will be described below.

For example, it is assumed that the scanning line has a secondary curve, which is convex toward the −Z side, immediately after the scanning line passes through the scanning lens 2105a of the K station. In this case, because the scanning lens 2105d of the C station is substantially identical to the scanning lens 2105a of the K station, the scanning line has a secondary curve, which is convex toward the +Z side, immediately after the scanning line passes through the scanning lens 2105d. However, because the K and C stations are equal to each other in the number of reflection mirrors (two reflection mirrors), the scanning line curve directions are aligned with each other on the photosensitive drums of the K and C stations.

It is assumed that the scanning line has the secondary curve, which is convex toward the −Z side, immediately after the scanning line passes through the scanning lens 2105b of the Y station. In this case, because the scanning lens 2105c of the M station is substantially identical to the scanning lens 2105b of the Y station, the scanning line has the secondary curve, which is convex upward, immediately after the scanning line passes through the scanning lens 2105c. However, because the Y and M stations are equal to each other in the number of reflection mirrors (two reflection mirrors), the scanning line curve directions are aligned with each other on the photosensitive drums of the Y and M stations.

In this example, it is preferable to make the scanning lenses of the scanning optical systems of the four stations be substantially identical to one another. In such case, the scanning line curve directions can be aligned with one another on the photosensitive drums of the four stations, and therefore the color shift is further hardly conspicuous.

In this case, the scanning line curve correction circuit 3223 may correct the scanning line curves of the other three stations according to the scanning line curve of one station. The four stations are identical to one another in the scanning line curve direction, so that the adjustment amounts of the scanning line curves can be decreased.

In the-above described example, the four scanning optical systems are equal to one another in the number of reflection mirrors (two reflection mirrors). Alternatively, in any two of the four scanning optical systems, a difference of the number of reflection mirrors may be zero or a multiple of two. In this case, similarly the scanning line curve directions can be aligned between the two stations corresponds to each other.

The two scanning optical systems corresponding to each other are not limited to the configuration and the disposition (the layout) as described above. Alternatively, the two scanning optical systems may be configured and disposed (laid out) such that trajectory of the luminous flux incident to the reflection mirror 2106 of the scanning optical systems of the two stations are curved in the directions opposite to each other.

As described above, the light beam scanning device 2010 includes the light source, the polygon mirror 2104 that deflects the luminous flux irradiated from the light source, the scanning optical system that is disposed on the optical path of the luminous flux deflected by the polygon mirror 2104. The scanning optical system includes the mirror group including the two reflection mirrors 2106 and 2108, and guides the luminous flux deflected by the polygon mirror 2104 to the photosensitive drum. The light beam scanning device 200 further includes the scanning line curve adjusting device 2107 that corrects the scanning line curve on the photosensitive drum by bending the reflection mirror 2106, and the scanning line tilt adjusting device 2109 that corrects the scanning line tilt on the photosensitive drum by turning the reflection mirror 2108. Through turning the reflection mirror 2108, the orientation, such as the attitude, of the reflection mirror 2108 can be changed.

In this case, the scanning line curve adjusting device 2107 and the scanning line tilt adjusting device 2109 are provided so as to correspond to the reflection mirrors 2106 and 2108, respectively. The scanning line curve adjusting device 2107 curves the reflection mirror 2106, and the scanning line tilt adjusting device 2109 turns the reflection mirror 2108. Therefore, both the curve and the tilt of the scanning line are accurately adjusted. Assuming that the background technique is used, since the scanning line curve adjusting device and the scanning line tilt adjusting device are provided in one reflection mirror, the one reflection mirror is not only curved but also turned to correct both the curve and the tile in the scanning line. Accordingly, there is a risk of degrading the adjustment accuracy in both the curve and the tilt of the scanning line.

Because the scanning line curve adjusting device 2107 and the scanning line tilt adjusting device 2109 are provided for the reflection mirrors 2106 and 2108, respectively, each adjusting device is easily placed with respect to the reflection mirror compared with the case that the scanning line curve adjusting device and the scanning line tilt adjusting device are provided with respect to the one reflection mirror.

Further, in the scanning optical system, the incident angle of the luminous flux to the reflection mirror 2108 is set greater than the incident angle of the luminous flux to the reflection mirror 2106.

In this case, the scanning line tilt adjusting device 2109 decreases the tilt angle of the reflection mirror 2108 with respect to the traveling direction of the luminous flux as much as possible, and the deviation of the optical path length of the luminous flux can be decreased with respect to the reflection mirror 2108. As a result, the curve and the tilt of the scanning line can be adjusted while suppressing degradation in optical performance of the scanning optical system.

The light source includes the surface emitting laser array chip 100, so that the photosensitive drum can simultaneously be scanned along the plural scanning lines. As a result, pixel density of the latent image can be enhanced or the latent image forming rate can be enhanced.

The color printer 2000 includes the light beam scanning device 2010 as described above, so that the generation of the color unevenness or the density unevenness of the image can be suppressed to improve the image quality.

The color printer 2000 is connected to an electronic arithmetic device (for example, a computer) and an image information communication system (for example, a facsimile machine) through the network, which allows the formation of an information processing system in which one image forming apparatus can process the outputs from plural devices. When the plural image forming apparatuses are connected on the network, a state (for example, how a job is crowded, whether a power is turned on, and whether breakdown is generated) of each image forming apparatus can be checked from each output request, the image forming apparatus having the best condition (most suitable to a user's expectation) is selected, and the image can be formed.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

Figure 17:
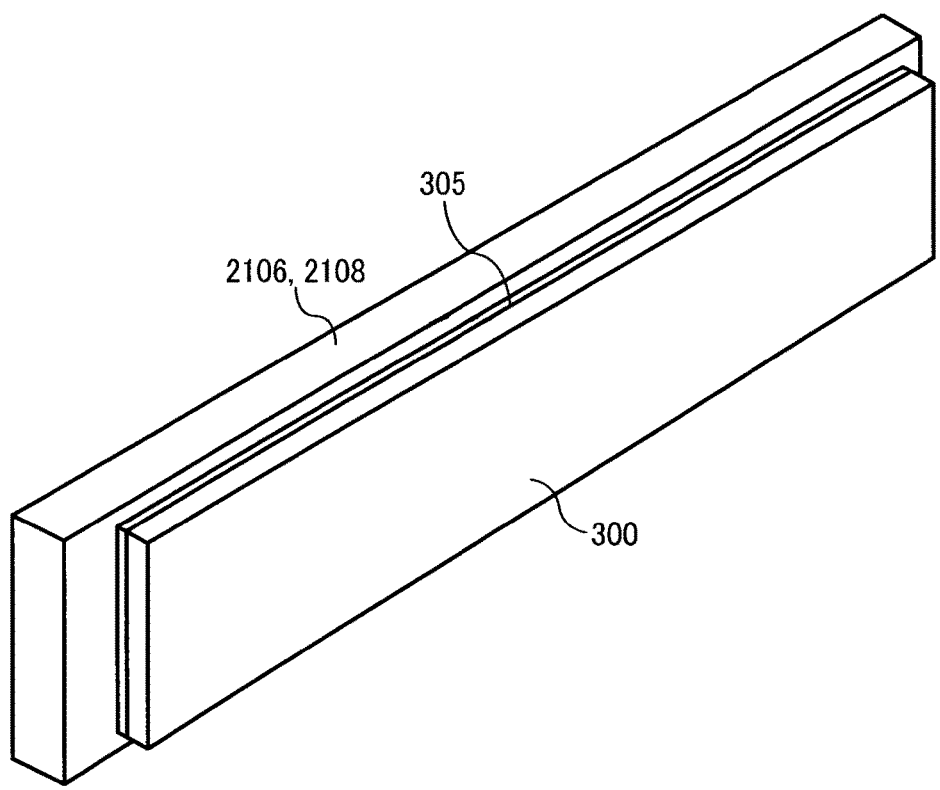
FIG. 17 is a view illustrating a reinforcing member, which may be attached to a reflection mirror of a light beam scanning device, according to another example embodiment of the present invention.

For example, as illustrated in FIG. 17, a rigid plate 300 that is of a reinforcing member may be attached to at least one of eight reflection mirrors 2106 (2108). In this case, a vibration of the reflection mirror due to propagation of a vibration to the reflection mirror from driving modules, such as the polygon mirror 2104, can be suppressed, and therefore misregistration of the scanning line can be prevented. For example, the rigid plate 300 may be fixed to a surface (a rear surface) on the opposite side to the reflecting surface of the reflection mirror 2106 (2108) with a double-sided adhesion tape (or a bonding agent) 305 interposed therebetween. The reinforcing member is not limited to the rigid plate. Alternatively, any member that can suppress the vibration of the reflection mirror may be used as the reinforcing member.

In the above-described example, the scanning control device 3022 controls the scanning line curve adjusting device 2107 and the scanning line tilt adjusting device 2109. Alternatively, the printer control device 2090 may control the scanning line curve adjusting device 2107 and the scanning line tilt adjusting device 2109, or a user, a service person, or a worker may manually drive the scanning line curve adjusting device 2107 and the scanning line tilt adjusting device 2109 through an operation module. In this case, for example, the scanning line curve and tilt detected by the printer control device 2090 are displayed on a monitor, and the user, the service person, or the worker may drive the scanning line curve adjusting device and the scanning line tilt adjusting device while viewing the monitor or the image actually printed on paper.

In the above-described example, the adjust screw 202 and the rotating shaft 210 are rotated by the stepping motors, respectively. Alternatively, for example, the worker may manually adjust at least one of the adjust screw and the rotating shaft when the apparatus is shipped, or the service person may manually adjust at least one of the adjust screw and the rotating shaft during maintenance.

In this example, the printer control device 2090 detects the misregistration (the curve and the tilt) of the scanning line. Alternatively, for example, the CPU 3210 may detect the misregistration of the scanning line.

In this example, the scanning control device 3022 corrects the misregistration (the curve and the tilt) of the scanning line. Alternatively, for example, the printer control device 2090 may correct the misregistration of the scanning line.

In this example, the two light sources are provided. Alternatively, one, three, or four light sources may be provided. In the case that the one light source is provided, one luminous flux from one light source may be divided into four luminous fluxes, and the four luminous fluxes are guided to the deflector. In the case that the three light sources are provided, the luminous flux from one light source is divided into two luminous fluxes, and the divided two luminous fluxes and two luminous fluxes from the other two light sources may be guided to the deflector. In the case that the four light sources are provided, four luminous fluxes from four light sources may be guided to the deflector.

In this example, the scanning line curve adjusting device 2107 includes the adjust screw and the stepping motor that rotates the adjust screw, and the scanning line curve adjusting device 2107 curves the reflection mirror 2106 such that the reflection mirror 2106 has the curvature in the main scanning direction. Alternatively, the scanning line curve adjusting device 2107 may be configured such that the reflection mirror 2106 is bent while having the curvature in the direction except the sub-scanning direction B.

In this example, the scanning line tilt adjusting device 2109 includes the rotating shaft and the stepping motor that rotates the rotating shaft. Alternatively, the scanning line tilt adjusting device 2109 may be configured such that the reflection mirror 2108 is bent with respect to the traveling direction of the luminous flux, more particularly such that the position of the reflection mirror 2108 varies along the main scanning direction A with respect to the traveling direction of the luminous flux.

In this example, the scanning line curve adjusting device 2107 is provided according to the reflection mirror 2106, the scanning line tilt adjusting device 2109 is provided according to the reflection mirror 2108, the deflection angle (the sum of the incident angle and the reflecting angle) of the luminous flux to the reflection mirror 2108 is larger than the deflection angle of the luminous flux to the reflection mirror 2106. Alternatively, the scanning line tilt adjusting device may be provided according to the reflection mirror 2106, the scanning line curve adjusting device may be provided according to the reflection mirror 2108, and the deflection angle of the luminous flux to the reflection mirror 2106 may be larger than the deflection angle of the luminous flux to the reflection mirror 2108.

In this example, the scanning optical system includes the two reflection mirrors. Alternatively, the scanning optical system may include at least three reflection mirrors. In the case that the scanning optical system includes at least three reflection mirrors, the scanning line curve adjusting device may be provided according to one of at least the three reflection mirrors, the scanning line tilt adjusting device may be provided according to the other at least two reflection mirrors, and the deflection angle of the luminous flux to the other at least two reflection mirrors may be larger than the deflection angle of the luminous flux to one of the reflection mirrors.

In this example, the scanning line curve adjusting device and the scanning line tilt adjusting device are provided according to each station. Alternatively, the scanning line curve adjusting device and the scanning line tilt adjusting device may be provided according to at least one station.

In this example, in each scanning optical system, the incident angle of the luminous flux to the reflection mirror 2108 in which the scanning line tilt adjusting device 2107 is provided is set larger than the incident angle of the luminous flux to the reflection mirror 2106 in which the scanning line curve adjusting device 2109 is provided. However, the opposite is also true.

In this example, only the secondary component included in the scanning line curve is corrected. Alternatively, the high-order components of the tertiary component or more, which are included in the scanning line curve, may be corrected instead of or in addition to the secondary component. In this case, for example, at least two adjust screws may be provided as the pressing module.

In this example, the two stations corresponding to each other are configured and disposed (laid out) such that the loci of the luminous fluxes incident to the reflection mirrors 2106 of the scanning optical systems of the stations are opposite to each other. Alternatively, the two stations corresponding to each other may not be configured and disposed (laid out) as described above.

In this example, the deflection angle $\beta_2$ of the luminous flux to the reflection mirror 2108*b* of the Y station is set smaller than the deflection angles $\beta_1$, $\beta_3$, and $\beta_4$ of the luminous fluxes to the reflection mirrors 2108*a*, 2108*c*, and 2108*d* of the other three stations. Alternatively, the deflection angle $\beta_2$ may not be set smaller than the deflection angles $\beta_1$, $\beta_3$, and $\beta_4$.

In this example, each scanning optical system includes one scanning lens and two reflection mirrors. Alternatively, the scanning optical system may further include at least one of optical members, such as a lens and a mirror.

In this example, the four photosensitive drums are arrayed in the order of black, yellow, magenta, and cyan from the −X side toward the +X side. However, the array sequence of the photosensitive drums may properly be changed.

In this example, the two-dimensional array includes the 32 light emitting modules. The two-dimensional array is not limited to the above-described embodiment.

Alternatively, a semiconductor laser chip or a semiconductor laser array chip may be used instead of the surface emitting laser array chip 100.

A synchronous mirror and a tailing end synchronization detection sensor may further be included in order to partially receive the post-write luminous flux passing through the scanning optical system of each station.

In this case, the CPU 3210 obtains a time necessary to scan the distance between the leading end synchronization detection sensor and the tailing end synchronization detection sensor with the luminous flux from the output signals of the leading end synchronization detection sensor and the tailing end synchronization detection sensor in each station, and the CPU 3210 can reset a reference frequency of the pixel clock signal such that the predetermined number of pulses falls within the time. Therefore, a total-width scaling factor of the image recorded by each station can stably be retained on the transfer belt.

In this example, the toner image is transferred from the photosensitive drum to the recording sheet through the transfer belt. Alternatively, the toner image may directly be transferred to the recording sheet.

In this example, the color printer 2000 is used as the image forming apparatus. Alternatively, for example, an optical plotter or a digital copying device may be used as the image forming apparatus. Alternatively, a monochrome printer in which one photosensitive drum is provided may be used as the image forming apparatus.

Alternatively, an image forming apparatus in which a silver halide film is used as the image bearing member may be used. In this case, the latent image is formed on the silver halide film by the optical beam scanning, and the latent image can be visualized through a process equivalent to a development process in a usual silver-halide photographic process. The visualized image can be transferred to printing paper that is of a transfer target through a process equivalent to a printing process in the usual silver-halide photographic process. The image forming apparatus in which the silver halide film is used can be constructed as an optical plate making apparatus or an optical drawing apparatus that draws a CT scan image.

In the image forming apparatus, a coloring medium (positive printing paper) that is colored by thermal energy of the beam spot may be used as the image bearing member. In this case, the visible image can directly be formed on the image bearing member by the optical beam scanning.

In one example, the present invention may reside in a light beam scanning device that scans a luminous flux to a scanned surface, which includes; irradiating means for irradiating the luminous flux; deflecting means for deflecting the luminous flux irradiated by the irradiating means; guiding means for guiding the deflected luminous flux to the scanned surface, the guiding means having a set of mirrors; scanning line curve adjusting means for bending a first mirror of the set of mirrors so as to correct a curve in a scanning line on the scanned surface; and scanning line tilt adjusting means for changing orientation of a second mirror of the set of mirrors so as to correct a tilt in the scanning line on the scanned surface.

For example, the first mirror may be the reflection mirror 2106, and the second mirror may be the reflection mirror 2108. The irradiating means may correspond to the light source. The deflecting means may correspond to the polygon mirror. The guiding means may correspond to the optical system. The scanning line curve adjusting means may correspond to the scanning line curve adjusting device 2107. The scanning line tilt adjusting means may correspond to the scanning line tilt adjusting device 2109. The scanned surface may be the surface of the photoconductive drum 2030.

The line beam scanning device may further include controlling means for correcting the curve in the scanning line using the scanning tilt adjusting means and correcting the tilt in the scanning line using the scanning line curve adjusting means, respectively, based on positional shift information of the scanning line. The controlling means may correspond to the scanning control device 3022.

In one example, the present invention may reside in a method of adjusting a scanning line scanned by a light beam scanning device. The light beam scanning device includes: a light source configured to irradiate a luminous flux; a deflector configured to deflect the luminous flux irradiated from the light source; and an optical system disposed on an optical path of the deflected luminous flux and configured to guide the deflected luminous flux to a scanned surface, the optical system having a set of mirrors. The scanning line adjusting method includes: bending a first mirror of the set of mirrors so as to correct a curve in the scanning line on the scanned surface; and changing orientation of a second mirror of the set of mirrors so as to correct a tilt in the scanning line on the scanned surface. The scanning line adjusting method may be implemented by, for example, a control device that may be provided in the light beam scanning device.

In one example, the present invention may reside in a non-transitory recording medium, which stores a control program that causes a processor to perform the above-described scanning line adjusting method.

What is claimed is:

1. A light beam scanning device that scans a luminous flux to a scanned surface, the device comprising:
   a light source configured to irradiate the luminous flux;
   a deflector configured to deflect the luminous flux irradiated from the light source;
   an optical system disposed on an optical path of the deflected luminous flux and configured to guide the deflected luminous flux to the scanned surface, the optical system having a set of mirrors including a first mirror and a second mirror, each of said mirrors being disposed on an optical path between the deflector and a scanned surface corresponding to said light source;
   a scanning line curve adjusting device configured to bend the first mirror so as to correct a curve in a scanning line on the scanned surface; and
   a scanning line tilt adjusting device configured to change orientation of the second mirror so as to correct a tilt in the scanning line on the scanned surface,
   wherein the scanning line curve adjusting device is configured to bend the first mirror without changing orientation of the second mirror, and wherein the scanning line tilt adjusting device is configured to change orientation of the second mirror without bending the first mirror.

2. The light beam scanning device of claim 1, wherein an incident angle of the luminous flux to the second mirror is set greater than an incident angle of the luminous flux to the first mirror.

3. The light beam scanning device of claim 1, further comprising:
   a control device configured to obtain positional shift information of the scanning line, and cause the scanning line curve adjusting device to correct the curve in the scanning line and to cause the scanning tilt adjusting device to correct the tilt in the scanning line respectively based on the positional shift information.

4. The light beam scanning device of claim 3, wherein the control device partially corrects a secondary component of the curve in the scanning line.

5. The light beam scanning device of claim 3, wherein the control device only corrects a component having an order equal to or lower than a secondary component in the scanning line.

6. The light beam scanning device of claim 1, wherein when the scanned surface includes a plurality of scanned surfaces, and the luminous flux includes a plurality of luminous fluxes,
   the optical system includes, as the set of mirrors, a plurality of sets of mirrors that are respectively correspond to the plurality of scanned surfaces and configured to respectively guide the plurality of luminous fluxes that are deflected by the deflector to the plurality of scanned surfaces,
   the scanning line curve adjusting device includes a plurality of scanning line curve adjusting devices that respectively correspond to the plurality of sets of mirrors,
   the scanning line tilt adjusting device includes a plurality of scanning line tilt adjusting devices that respectively correspond to the plurality of sets of mirrors, and
   a control device corrects the curve in the scanning line on each one of the plurality of scanned surfaces independently from one another using each one of the plurality of scanning line curve adjusting devices, and the tilt in the scanning line on each one of the plurality of scanned surface independently from one another using each one of the plurality of scanning line tilt adjusting devices.

7. The line beam scanning device of claim 1, wherein when the scanned surface includes a plurality of scanned surfaces, and the luminous flux includes a plurality of luminous fluxes, the optical system includes:
a first optical system having a first set of mirrors that corresponds to a portion of the plurality of scanned surfaces configured to guide a part of the plurality of luminous fluxes deflected by the deflector to a part of the plurality of scanned surfaces; and
a second optical system having a second set of mirrors that corresponds to the other portion of the plurality of scanned surfaces configured to guide the other part of the plurality of luminous fluxes deflected by the deflector to the other part of the plurality of scanned surfaces,
the scanning line curve adjusting device is provided so as to correspond to at least one of the first set of mirrors and the second set of mirrors,
the scanning line tilt adjusting device is provided so as to correspond to the at least one of the first set of mirror and the second set of mirrors to which the scanning line curve adjusting device is provided, and
a trajectory of incident flux to the first set of mirrors of the first optical system and a trajectory of incident flux to the second set of mirrors of the second optical system are curved in opposite direction from each other.

8. The line beam scanning device of claim 1, wherein when the scanned surface includes a plurality of scanned surfaces, and the luminous flux includes a plurality of luminous fluxes,
the optical system includes, as the set of mirrors, a plurality of sets of mirrors that are respectively correspond to the plurality of scanned surfaces and configured to respectively guide the plurality of luminous fluxes deflected by the deflector to the plurality of scanned surfaces,
the scanning line curve adjusting device is provided so as to correspond to at least one of the plurality of sets of mirrors,
the scanning line tilt adjusting device is provided so as to correspond to the at least one of the plurality of sets of mirrors to which the scanning line curve adjusting device is provided, and
the difference in number of mirrors between two sets of mirrors of the plurality of sets of mirrors is zero or a multiple of two.

9. The line beam scanning device of claim 1, wherein when the scanned surface includes a plurality of scanned surfaces including a scanned surface used for forming a yellow image, and the luminous flux includes a plurality of luminous fluxes,
the optical system includes a plurality of sets of mirrors that are respectively correspond to the plurality of scanned surfaces and configured to respectively guide the plurality of luminous fluxes that are deflected by the deflector to the plurality of scanned surfaces,
the scanning line curve adjusting device is provided so as to correspond to at least one set of the plurality of sets of mirrors,
the scanning line tilt adjusting device includes a plurality of scanning line tilt adjusting devices that respectively correspond to the plurality of sets of mirrors, and
the second mirror of the plurality of sets of mirrors is included in a set of mirrors that corresponds to the scanned surface for forming the yellow image, the set of mirrors having the second mirror has a minimum value of incident angle of the luminous flux.

10. The line beam scanning device of claim 1, wherein at least one of the first mirror and the second mirror of the set of mirrors is provided with a reinforcing member.

11. An image forming apparatus, comprising:
the line beam scanning device of claim 1; and
an image forming device configured to form an image based on a latent image formed on the scanned surface by the line beam scanning device.

12. A light beam scanning device that scans a luminous flux to a scanned surface, the device comprising:
irradiating means for irradiating the luminous flux;
deflecting means for deflecting the luminous flux irradiated by the irradiating means;
guiding means for guiding the deflected luminous flux to the scanned surface, the guiding means having a set of mirrors including a first mirror and a second mirror, each of said mirrors being disposed on an optical path between the deflecting means and a scanned surface corresponding to said irradiating means;
scanning line curve adjusting means for bending a first mirror of the set of mirrors so as to correct a curve in a scanning line on the scanned surface; and
scanning line tilt adjusting means for changing orientation of a second mirror of the set of mirrors so as to correct a tilt in the scanning line on the scanned surface.

13. The light beam scanning device of claim 12, further comprising:
controlling means for correcting the curve in the scanning line using the scanning tilt adjusting means and correcting the tilt in the scanning line using the scanning line curve adjusting means, respectively, based on positional shift information of the scanning line.

14. An image forming apparatus, comprising:
the light beam scanning device of claim 12; and
an image forming device configured to form an image based on a latent image formed on the scanned surface by the line beam scanning device.

15. A method of adjusting a curve and a tilt in a scanning line scanned by a light beam scanning device,
the light beam scanning device including: a light source configured to irradiate a luminous flux; a deflector configured to deflect the luminous flux irradiated from the light source; and an optical system disposed on an optical path of the deflected luminous flux and configured to guide the deflected luminous flux to a scanned surface, the optical system having a set of mirrors including a first mirror and a second mirror, each of said mirrors being disposed on an optical path between the deflector and a scanned surface corresponding to said light source, the scanning line adjusting method comprising:
bending the first mirror so as to correct a curve in the scanning line on the scanned surface; and
changing orientation of the second mirror so as to correct a tilt in the scanning line on the scanned surface,
wherein the step of bending the first mirror is performed without changing orientation of the second mirror, and
wherein the step of changing orientation of the second mirror is performed without bending the first mirror.

16. A light beam scanning device that scans a luminous flux to a scanned surface, the device comprising:
a light source configured to irradiate the luminous flux;
a deflector configured to deflect the luminous flux irradiated from the light source;

an optical system disposed on an optical path of the deflected luminous flux and configured to guide the deflected luminous flux to the scanned surface, the optical system having a set of mirrors including a first mirror and a second mirror each disposed on an optical path between the deflector and the scanned surface corresponding to the light source;

a scanning line curve adjusting device configured to bend the first mirror so as to correct a curve in a scanning line on the scanned surface; and a scanning line tilt adjusting device configured to change orientation of the second mirror so as to correct a tilt in the scanning line on the s canned surface, wherein the first mirror does not include a mechanism to change orientation of the first mirror, and wherein the second mirror does not include a mechanism to bend the second mirror.

* * * * *